(12) United States Patent
Lee et al.

(10) Patent No.: US 7,365,922 B2
(45) Date of Patent: Apr. 29, 2008

(54) OPTICAL DEVICES

(75) Inventors: Jin-Yu Lee, Tainan (TW); Yung-Hsing Wang, Taichung (TW); Chien-Sheng Liu, Tainan (TW); Meng-Che Tsai, Kaohsiung (TW); Kun-Wei Lin, Tainan (TW); Ying-Chi Chuo, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 253 days.

(21) Appl. No.: 11/269,203

(22) Filed: Nov. 8, 2005

(65) Prior Publication Data

US 2007/0039015 A1 Feb. 15, 2007

(30) Foreign Application Priority Data

Jul. 29, 2005 (TW) .............................. 94125904 A

(51) Int. Cl.
*G02B 15/14* (2006.01)
(52) U.S. Cl. ...................................... 359/813; 359/694

(58) Field of Classification Search ................. 359/813
See application file for complete search history.

(56) References Cited

U.S. PATENT DOCUMENTS

| | | | | |
|---|---|---|---|---|
| 5,453,881 A | * | 9/1995 | Suzuki | 359/824 |
| 5,966,248 A | * | 10/1999 | Kurokawa et al. | 359/697 |
| 6,856,469 B2 | | 2/2005 | Yoneyama et al. | |
| 7,113,351 B2 | * | 9/2006 | Hovanky | 359/824 |
| 2001/0030814 A1 | * | 10/2001 | Koyama et al. | 359/811 |
| 2004/0207936 A1 | * | 10/2004 | Yamamoto et al. | 359/819 |

\* cited by examiner

*Primary Examiner*—Jordan M. Schwartz
*Assistant Examiner*—James C Jones
(74) *Attorney, Agent, or Firm*—Quintero Law Office

(57) ABSTRACT

An optical device. A lens module is movably disposed in a lens housing. A drive mechanism is connected to the lens module, driving the lens module along an optical axis of the lens module. A brake mechanism is disposed between the lens housing and the lens module and moves perpendicular to the optical axis, fixing and releasing the lens module. When the brake mechanism releases the lens module, the lens module moves along the optical axis.

13 Claims, 7 Drawing Sheets

OPTICAL DEVICES

BACKGROUND

The invention relates to optical devices, and in particular to optical devices with reduced electrical consumption.

Automatic displacement driving devices applied in lens modules may employ drivers providing rotational power with a rotational axis thereof paralleling an optical axis of the lens module, or drivers providing movement power with the moving direction thereof paralleling the optical axis of the lens module.

An example of a driver providing rotational power with a rotational axis thereof paralleling an optical axis of the lens module is a stepping motor. Such drivers require additional transmission-transforming mechanisms to enable the lens module to move along an axis parallel to the optical axis. When the lens module arrives at a final position, no electricity is required to maintain the lens module therein. However, such drivers have many components. Thus, the structure of such drivers is complicated, and the size thereof cannot easily be reduced.

An example of a driver providing movement power with the moving direction thereof paralleling the optical axis of the lens module is a voice coil motor. Such drivers directly adjust the position of the lens module. Compared with rotational power drivers, such drivers have fewer components and are smaller. However, when the lens module arrives at a final position, electricity must be continuously supplied thereto and simultaneous control maintained in order to keep the lens module at the final position. Accordingly, automatic displacement driving devices employing such drivers consume a great deal of electrical power. The portability of cameras or optical devices employing such drivers is thus adversely affected.

In U.S. Pat. No. 6,856,469, a lens driving device is disclosed in which a magnetic member is disposed at two lens retaining positions along an optical axis direction of a lens module. This allows the lens module to be retained at the lens retaining positions by magnetic attraction between the driving magnet of the lens module and the magnetic members when the lens module is positioned at one of the lens retaining positions. However, in this device, a magnetic member must be disposed at each position in which the lens module is to be retained, reducing the flexibility of the focusing movement and adding complexity to the structure.

Hence, there is a need for an optical device for fixing and releasing a lens module with reduced size and power consumption and simplified structure.

SUMMARY

Accordingly, embodiments of the invention provide an optical device comprising a lens housing, a lens module, a drive mechanism, and a brake mechanism. The lens module is movably disposed in the lens housing. The drive mechanism is connected to the lens module, driving the lens module to move along an optical axis of the lens module. The brake mechanism is disposed between the lens housing and the lens module and moves perpendicular to the optical axis, thereby fixing and releasing the lens module. When the brake mechanism releases the lens module, the lens module moves along the optical axis.

The optical device further comprises at least one guide bar connected to the lens housing, parallel to the optical axis of the lens module. The lens module is fitted to and slides on the guide bar.

The drive mechanism comprises a first magnetic member and a first coil. The first magnetic member comprises a first surface and a second surface opposite thereto. The first coil is disposed between the lens module and the first surface of the first magnetic member. The first magnetic member provides a first magnetic field passing through the first coil. The lens module and first coil are driven to move along the optical axis by a force parallel to the optical axis and generated by magnetic interaction of the first coil and first magnetic field when an electric current is applied to the first coil.

The first coil encircles the lens module. The first magnetic member encircles the first coil. Central axes of the first coil and first magnetic member are aligned with the optical axis.

The drive mechanism further comprises a first yoke, connected to the first magnetic member and enclosing the first surface of the first magnetic member and the first coil, enhancing the magnetic flux density of the first magnetic field passing through the first coil.

The brake mechanism comprises a second yoke, a second coil, a displacement member, and a resilient member. The second yoke and second coil are disposed opposing the second surface of the first magnetic member. The second yoke is disposed in the second coil. The displacement member is connected to the second coil and surrounds the first magnetic member, first coil, and first yoke. The resilient member is disposed between the displacement member and the lens housing and provides predetermined resilience to the displacement member, enabling abutment between the displacement member and the lens module. The first magnetic member interacts with the first and second yokes, providing a second magnetic field passing through the second coil. The displacement member moves perpendicular to the optical axis and is separated from the lens module by a force perpendicular to the optical axis and generated by magnetic interaction of the second coil and second magnetic field when an electric current is applied to the second coil.

In one embodiment of the invention, the brake mechanism further comprises a friction member disposed on the displacement member opposing the lens module. The friction member preferably comprises frictional material.

In another embodiment of the invention, the optical device further comprises a second magnetic member and a magnetic-permeable member. The second magnetic member is disposed on the displacement member, and the magnetic-permeable member is disposed on the lens module opposing the second magnetic member. Alternatively, the second magnetic member is disposed on the lens module, and the magnetic-permeable member is disposed on the displacement member opposing the second magnetic member.

Preferably, the first magnetic member comprises a permanent magnet. The resilient member preferably comprises a spring. The second magnetic member preferably comprises a permanent magnet with magnetic flux density less than that of the first magnetic member.

DESCRIPTION OF THE DRAWINGS

The invention can be more fully understood by reading the subsequent detailed description and examples with references made to the accompanying drawings, wherein.

DETAILED DESCRIPTION

First Embodiment

Figure 1:
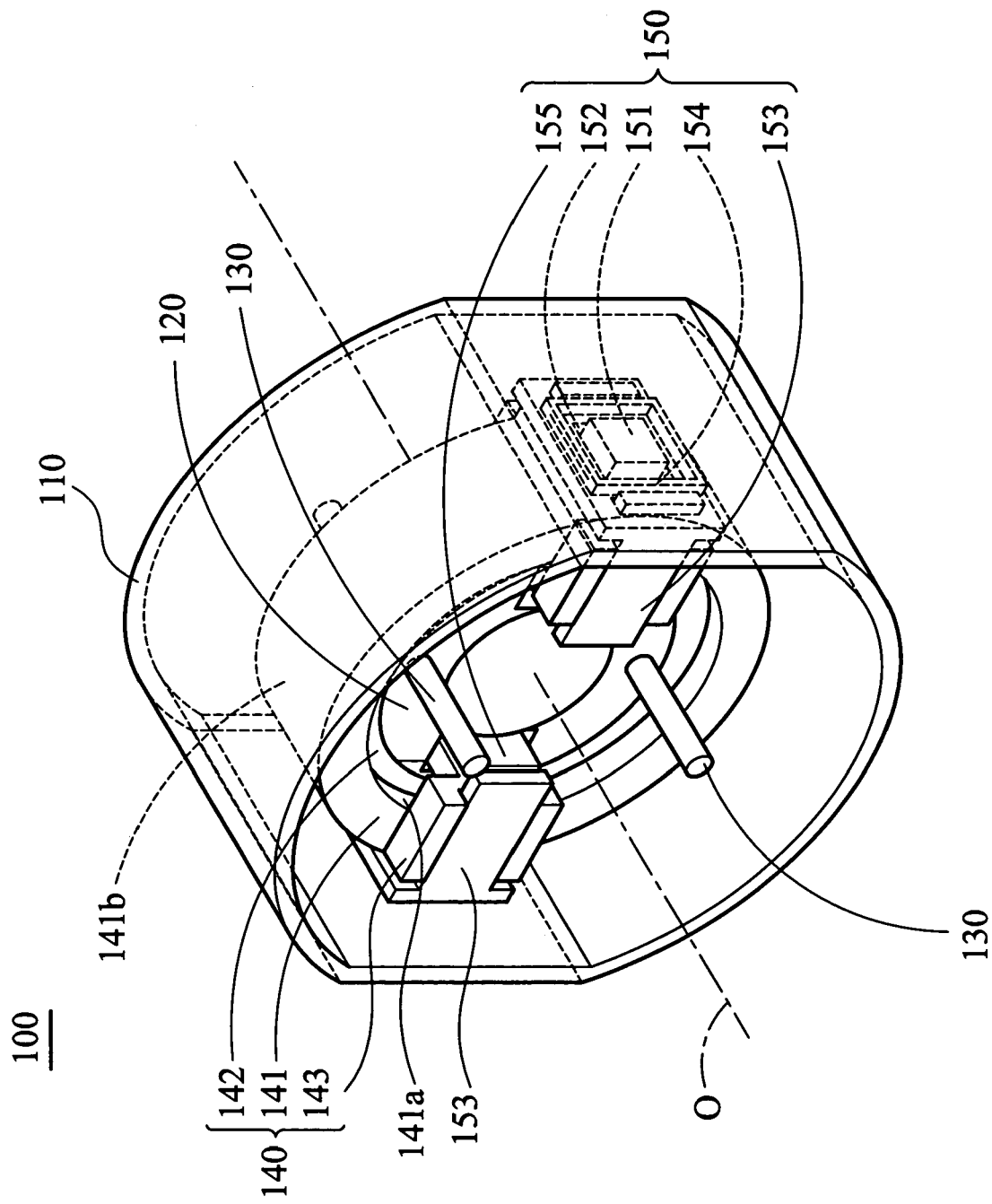
FIG. 1 is a schematic perspective view of an optical device of a first embodiment of the invention.

Referring to FIG. 1, the optical device 100 comprises a lens housing 110, a lens module 120, two guide bars 130, a drive mechanisms 140, and two symmetric brake mechanisms 150.

As shown in FIG. 1, the lens module 120 is disposed in the lens housing 110 and is movable along an optical axis O thereof. Specifically, the guide bars 130 are connected to the lens housing 110 parallel to the optical axis O. The lens module 120 is fitted to and slides on the guide bars 130.

The drive mechanism 140 is connected to the lens module 120 and comprises a first magnetic member 141, a first coil 142, and two first yokes 143. The first coil 142 encircles the lens module 120. The first magnetic member 141 encircles the first coil 142. Furthermore, central axes of the first coil 142 and first magnetic member 141 are aligned with the optical axis O of the lens module 120. The first yokes 143 are connected to the first magnetic member 141.

Figure 2A:
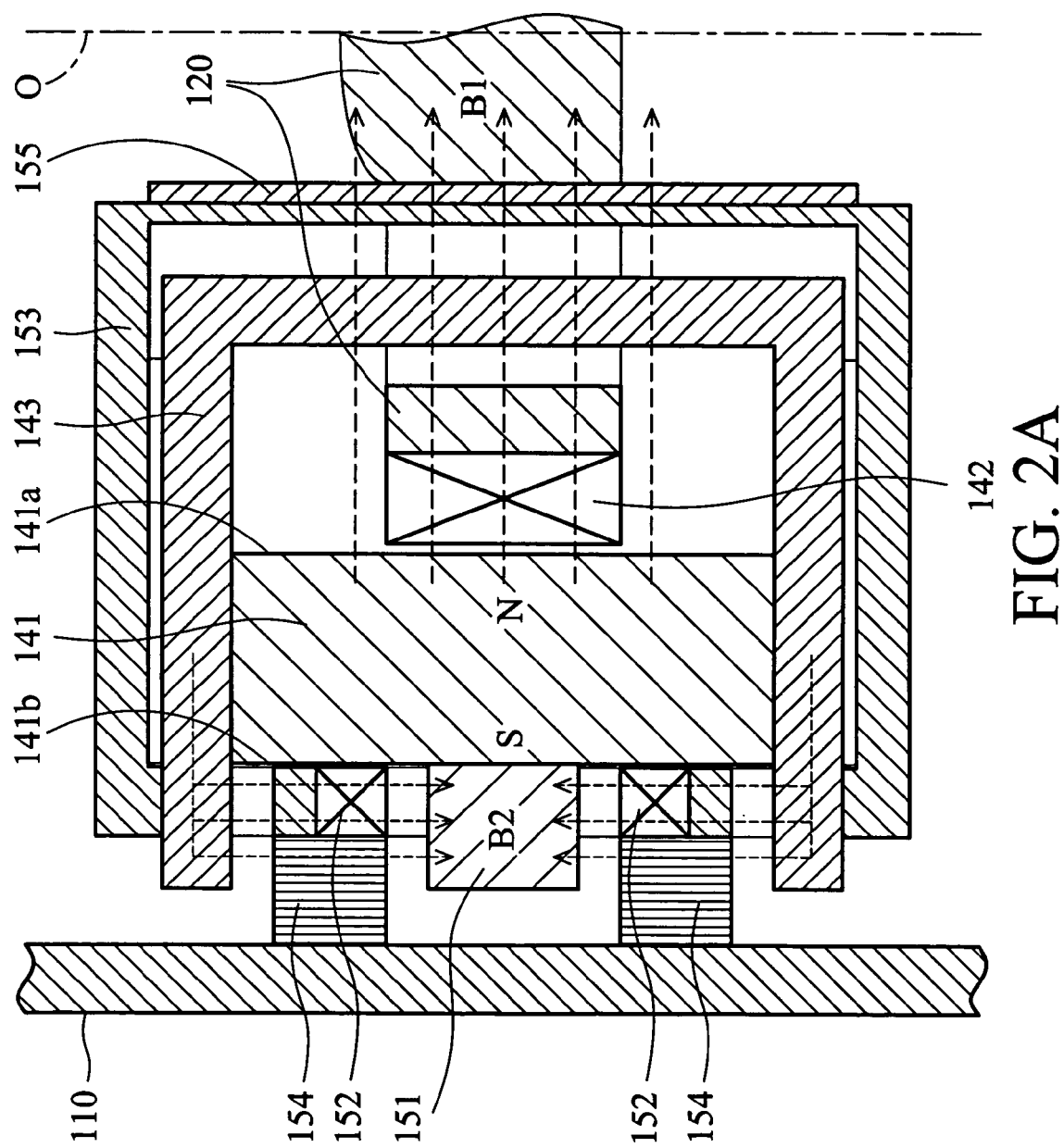
FIG. 2A is a schematic partial cross section of an optical device of a first embodiment of the invention.
Figure 2B:
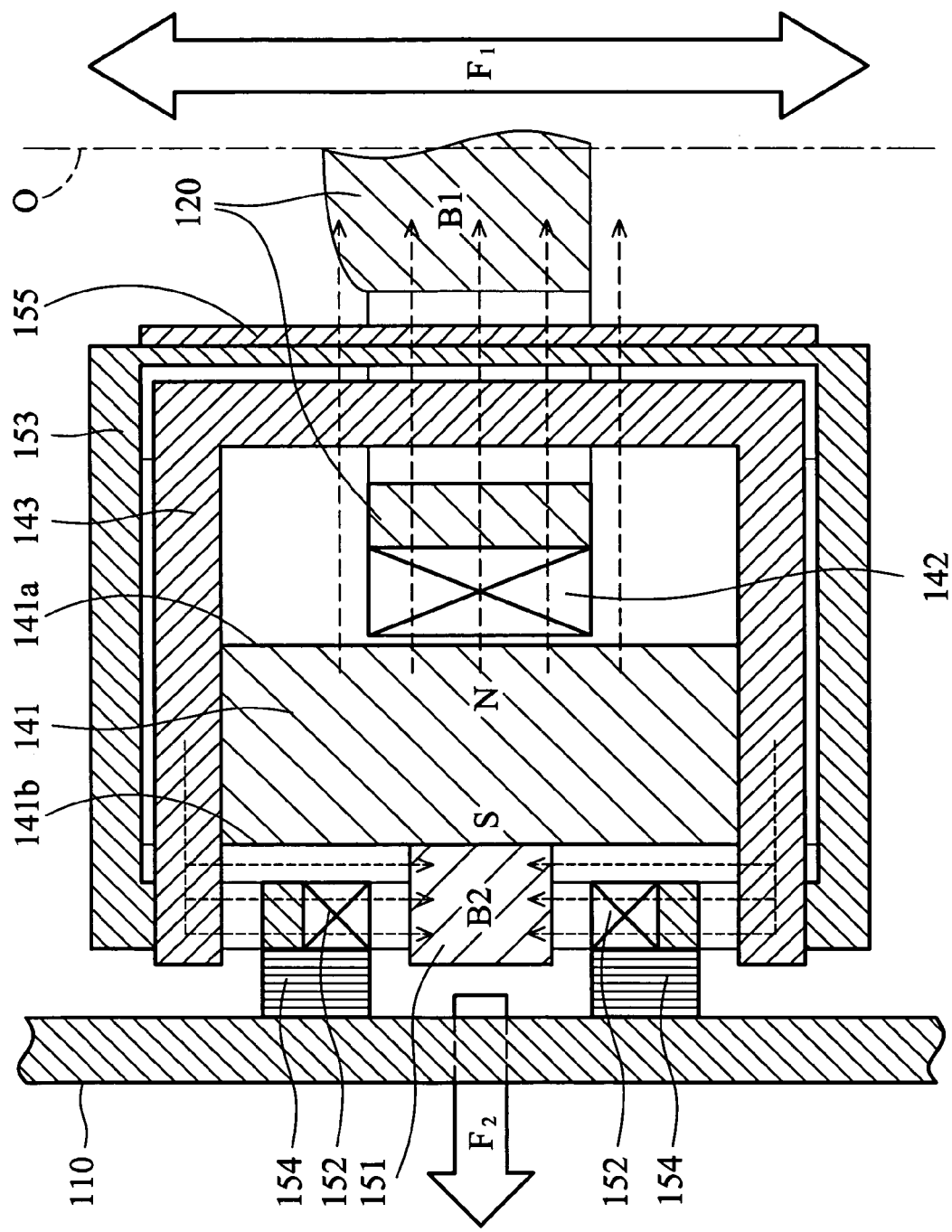
FIG. 2B is another schematic partial cross section of an optical device of a first embodiment of the invention.

The first magnetic member 141 comprises a first surface 141a and a second surface 141b opposite thereto. The first coil 142 is disposed between the lens module 120 and the first surface 141a of the first magnetic member 141. As shown in FIG. 2A and FIG. 2B, the first magnetic member 141 provides a first magnetic field B1, the magnetic lines of which pass through the first coil 142. As shown in FIGS. 1, 2A, and 2B, the first yoke 143 encloses the first surface 141a of the first magnetic member 141 and the first coil 142, enhancing the magnetic flux density of the first magnetic field B1 passing through the first coil 142.

Each brake mechanism 150 is disposed between the lens housing 110 and the lens module 120 and comprises a second yoke 151, a second coil 152, a displacement member 153, a resilient member 154, and a friction member 155. As shown in FIG. 2A and FIG. 2B, the second yoke 151 and second coil 152 are disposed opposing the second surface 141b of the first magnetic member 141. The second yoke 151 is disposed in the second coil 152. The displacement member 153 is connected to the second coil 152 and encircles the first magnetic member 141, first coil 142, and first yoke 143. The resilient member 154 is disposed between the displacement member 153 and the lens housing 110 and provides predetermined resilience (such as compression resilience) to the displacement member 153, enabling abutment between the displacement member 153 and the lens module 120, as shown in FIG. 2A. Specifically, as shown in FIG. 2A and FIG. 2B, the first magnetic member 141 interacts with the first yoke 143 and second yoke 151, providing a second magnetic field B2, magnetic lines of which pass through the second coil 152. The friction member 155 is disposed on the displacement member 153 opposing the lens module 120. In this embodiment, the friction member 155 comprises frictional material. The displacement member 153 tightly abuts the lens module 120 by friction provided by the friction member 155.

In this embodiment, the first magnetic member 141 comprises a permanent magnet and the resilient member 154 comprises a spring.

As shown in FIG. 2A, when the lens module 120 is stationary, the displacement member 153 abuts the lens module 120. When focus movement of the lens module 120 is performed, an electric current is applied to the second coil 152 to interact with the second magnetic field B2. A force $F_2$ perpendicular to the optical axis O is thus generated. The force $F_2$ moves the displacement member 153 perpendicular to the optical axis O and compresses the resilient member 154. At this point, as is shown in FIG. 2B, the displacement member 153 is separated from the lens module 120. Namely, the lens module 120 is released.

When an electric current is applied to the second coil 152, another electric current may be applied to the first coil 142 to interact with the first magnetic field B1. A force $F_1$ parallel to the optical axis O is thus generated. The force $F_1$ moves the lens module 120 and first coil 142 along the optical axis O, thereby achieving focus movement of the lens module 120. Moreover, an external control device (not shown) may be connected to the first coil 142, adjusting the direction and magnitude of the electric current applied thereto. The moving direction, speed, and position of the lens module 120 can thus be controlled.

When the lens module 120 reaches a target focus position, the electric current applied to the second coil 152 and first coil 142 is cut off. At this point, the lens module 120 and first coil 142 cease moving along the optical axis O in the absence of the force F1, and the displacement member 153 moves toward the optical axis O by the resilience provided by the resilient member 154 in the absence of the F2, again abutting the lens module 120, as shown in FIG. 2A. Accordingly, the lens module 120 is fixed in the target focus position.

It is understood that the optical device 100 is not limited to having a drive mechanism 140 having two yokes 143 corresponding to two symmetric brake mechanisms 150. Namely, the optical device 100 may comprise only a lens housing 110, a lens module 120, two guide bars 130, a drive mechanism 140 with a single yoke 143, and a single brake mechanism 150, and still achieve the same focus movement and fixing effect of the lens module 120. Additional, more than two brake mechanisms may be employed.

Second Embodiment

Elements corresponding to those in the first embodiment share the same reference numerals, and explanation thereof is omitted for simplification of the description.

Figure 3:
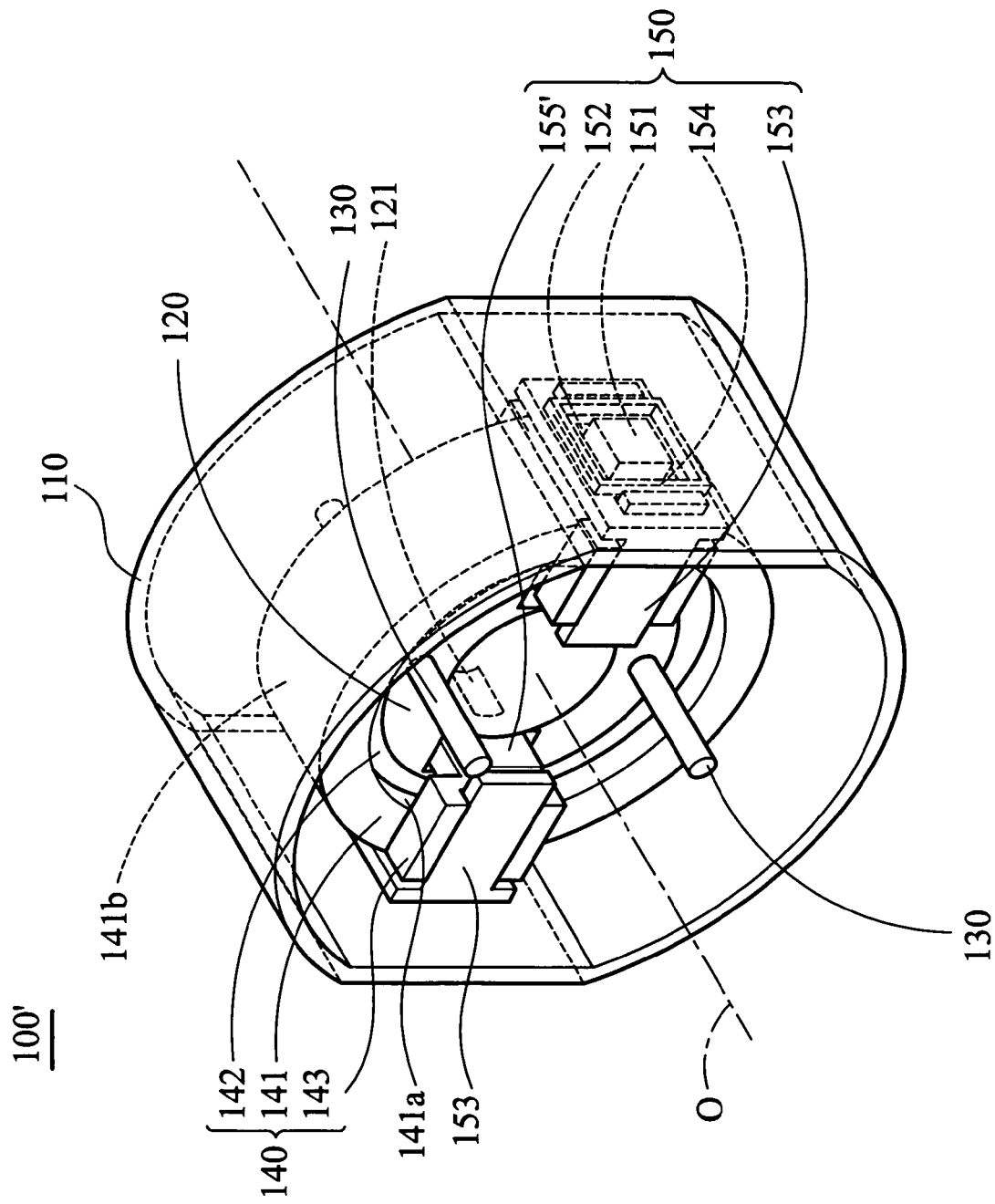
FIG. 3 is a schematic perspective view of an optical device of a second embodiment of the invention.
Figure 4A:
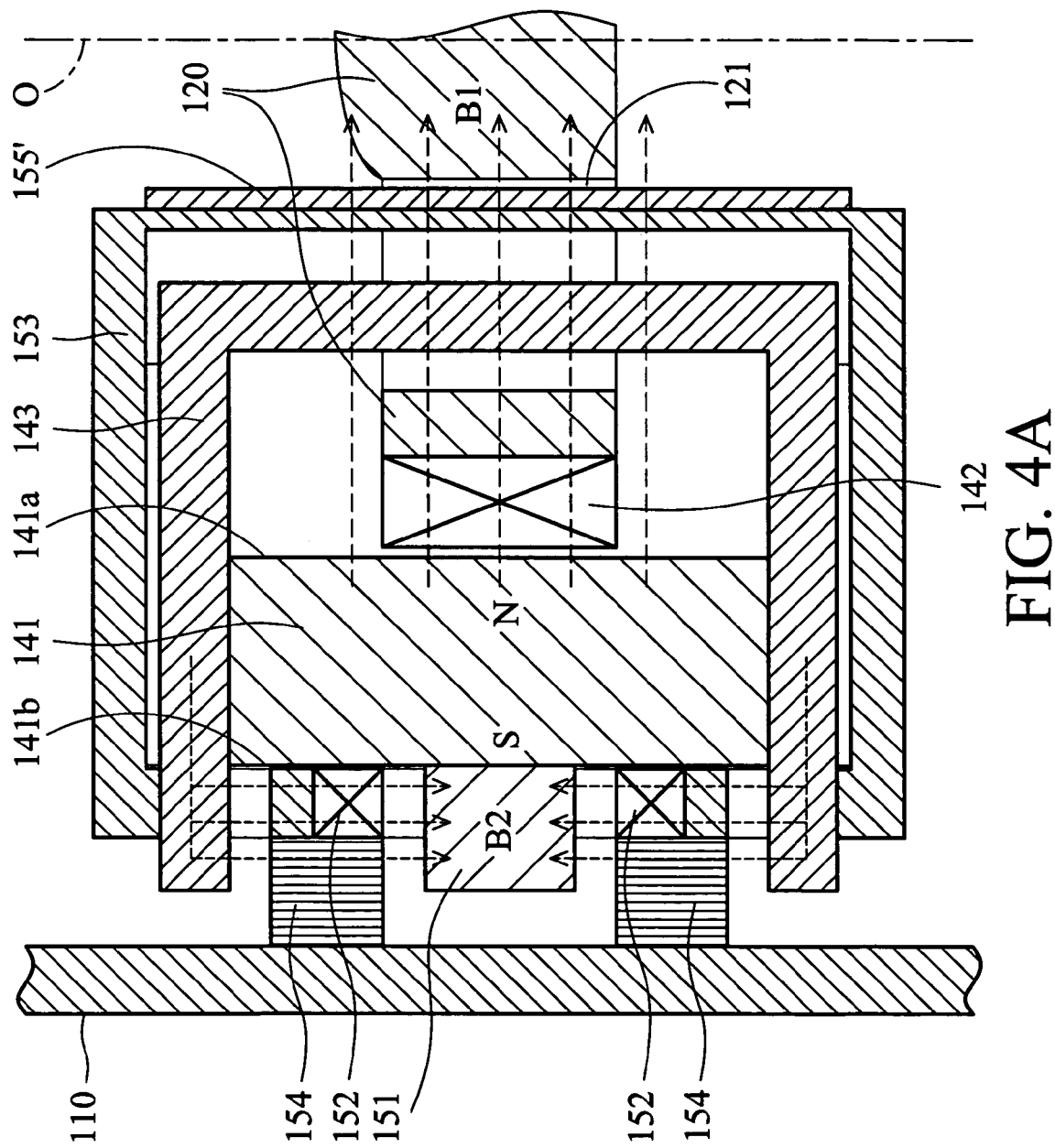
FIG. 4A is a schematic partial cross section of an optical device of a second embodiment of the invention.
Figure 4B:
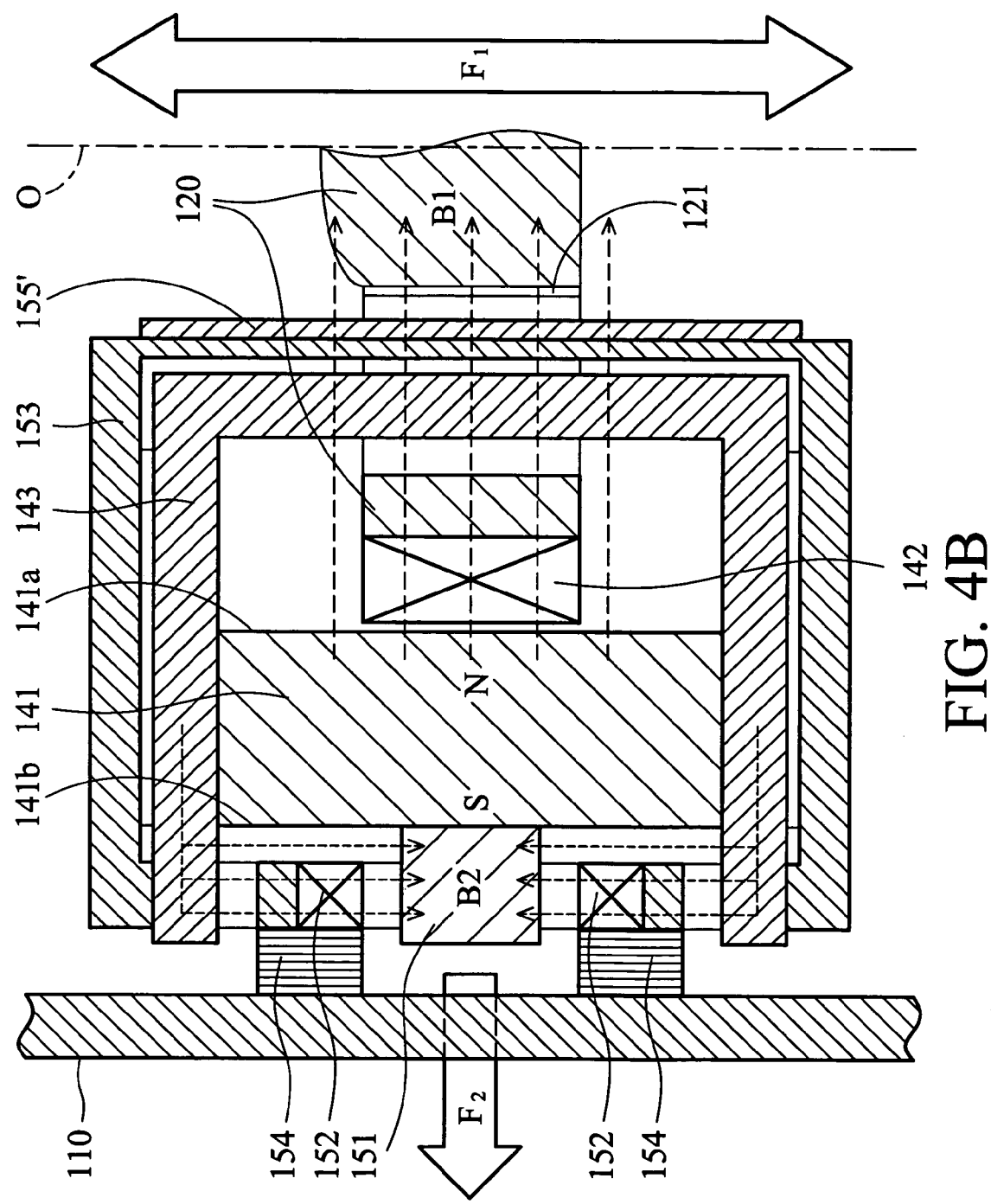
FIG. 4B is another schematic partial cross section of an optical device of a second embodiment of the invention.
Figure 5:
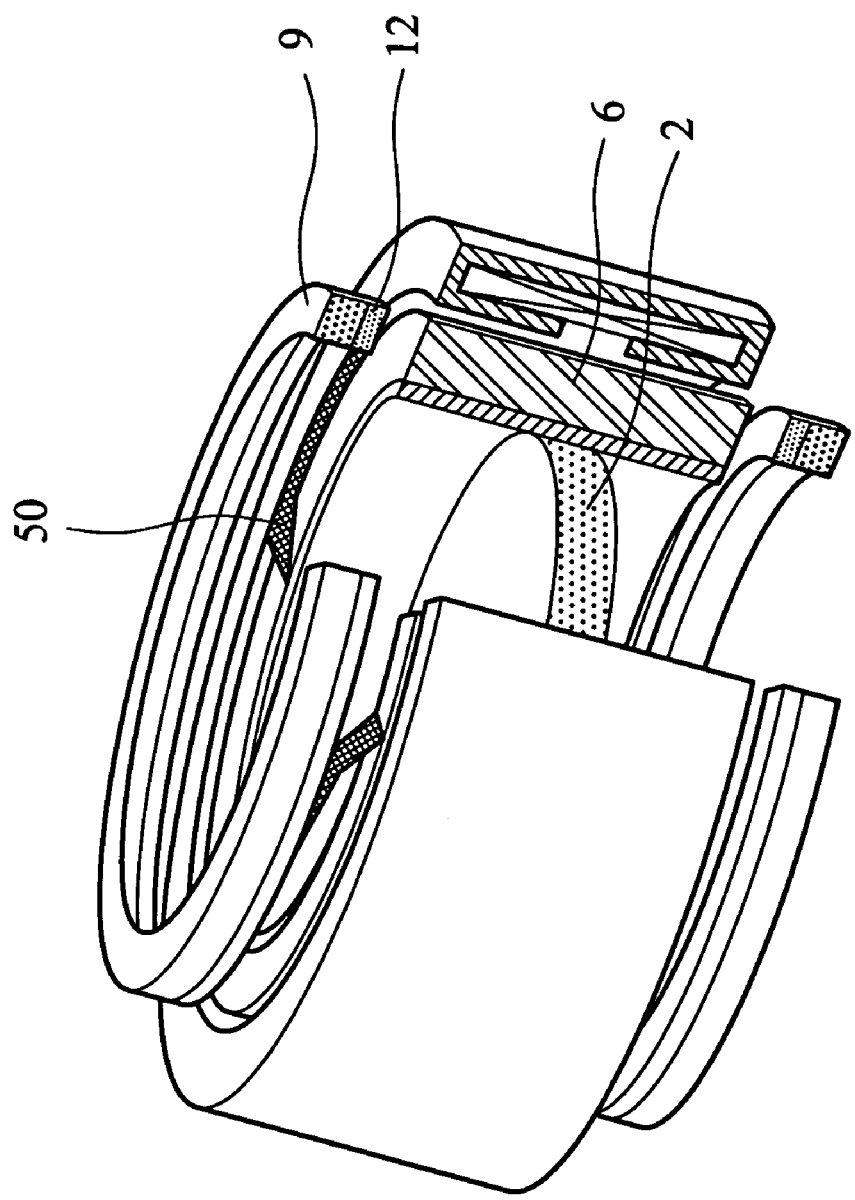
FIG. 5 is a partial perspective view of a conventional lens driving device.

Referring to FIGS. 3, 4A, and 4B, the optical device 100' of this embodiment comprises a second magnetic member 155' replacing the friction member 155 of the first embodiment and a magnetic-permeable member 121 disposed on the lens module 120 opposing the second magnetic member 155'. In this embodiment, the second magnetic member 155' preferably comprises a permanent magnet with magnetic flux density far less than that of s the first magnetic member 141.

Accordingly, absent force $F_2$, the displacement member 153 tightly abuts the lens module 120 by attraction between the second magnetic member 155' and the magnetic-permeable member 121.

It is understood the second magnetic member 155' and magnetic-permeable member 121 may be interchanged. Namely, the second magnetic member may be disposed on the lens module 120 and the magnetic-permeable member disposed on the displacement member 153, achieving the same attraction between the second magnetic member 155' and the magnetic-permeable member 121 and tight abutment between the displacement member 153 and the lens module 120.

Structure, disposition, and function of other elements of the optical device 100' are the same as those of the optical device 100, and explanation thereof is omitted for simplicity. Similarly, operation of the optical device 100' is the same as that of the optical device 100.

In conclusion, in the disclosed optical devices, the focus movement of the lens module is achieved by operation of the drive mechanism, and the lens module is maintained in the target focus position by operation of the brake mechanism with no requirement for electrical supply. Thus, electricity consumed by the disclosed optical devices is significantly reduced, and portability thereof enhanced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
    a lens housing;
    a lens module movably disposed in the lens housing;
    a drive mechanism connected to the lens module, driving the lens module along an optical axis of the lens module, wherein the drive mechanism comprises a first magnetic member and a first coil, the first magnetic member comprises a first surface and a second surface opposite thereto, the first coil is disposed between the lens module and the first surface of the first magnetic member, the first magnetic member provides a first magnetic field passing through the first coil, and the lens module and first coil are driven to move along the optical axis by a force parallel to the optical axis and generated by magnetic interaction of the first coil and first magnetic field when an electric current is applied to the first coil; and
    a brake mechanism disposed between the lens housing and the lens module and moving perpendicular to the optical axis, thereby fixing and releasing the lens module, wherein, when the brake mechanism releases the lens module, the lens module moves along the optical axis.

2. The optical device as claimed in claim 1, further comprising at least one guide bar connected to the lens housing parallel to the optical axis, wherein the lens module is fitted to and slides on the guide bar.

3. The optical device as claimed in claim 1, wherein the first coil encircles the lens module, the first magnetic member encircles the first coil, and central axes of the first coil and first magnetic member are aligned with the optical axis.

4. The optical device as claimed in claim 1, wherein the drive mechanism further comprises a first yoke, connected to the first magnetic member and enclosing the first magnetic member and the first coil, enhancing the magnetic flux density of the first magnetic field passing through the first coil.

5. The optical device as claimed in claim 4, wherein the brake mechanism comprises a second yoke, a second coil, a displacement member, and a resilient member, the second yoke and second coil are disposed opposing the second surface of the first magnetic member, the second yoke is disposed in the second coil, the displacement member is connected to the second coil and encircles the first magnetic member, first coil, and first yoke, the resilient member is disposed between the displacement member and the lens housing and provides predetermined resilience to the displacement member, enabling abutment between the displacement member and the lens module, the first magnetic member interacts with the first and second yokes, providing a second magnetic field passing through the second coil, and the displacement member moves perpendicular to the optical axis and is separated from the lens module by a force perpendicular to the optical axis and generated by magnetic interaction of the second coil and second magnetic field when an electric current is applied to the second coil.

6. The optical device as claimed in claim 5, wherein the brake mechanism further comprises a friction member disposed on the displacement member opposing the lens module.

7. The optical device as claimed in claim 6, wherein the friction member comprises frictional material.

8. The optical device as claimed in claim 5, further comprising a second magnetic member and a magnetic-permeable member, wherein the second magnetic member is disposed on the displacement member, and the magnetic-permeable member is disposed on the lens module opposing the second magnetic member.

9. The optical device as claimed in claim 5, further comprising a second magnetic member and a magnetic-permeable member, wherein the second magnetic member is disposed on the lens module, and the magnetic-permeable member is disposed on the displacement member opposing the second magnetic member.

10. The optical device as claimed in claim 1, wherein the first magnetic member comprises a permanent magnet.

11. The optical device as claimed in claim 5, wherein the resilient member comprises a spring.

12. The optical device as claimed in claim 8, wherein the second magnetic member comprises a permanent magnet with magnetic flux density less than that of the first magnetic member.

13. The optical device as claimed in claim 9, wherein the second magnetic member comprises a permanent magnet with magnetic flux density less than that of the first magnetic member.

* * * * *